(12) United States Patent
Jack

(10) Patent No.: US 7,245,055 B2
(45) Date of Patent: Jul. 17, 2007

(54) STATOR OF AN ELECTRICAL MACHINE

(75) Inventor: Alan Jack, Northumberland (GB)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 10/806,447

(22) Filed: Mar. 23, 2004

(65) Prior Publication Data

US 2004/0189138 A1   Sep. 30, 2004

Related U.S. Application Data

(60) Provisional application No. 60/473,195, filed on May 27, 2003.

(30) Foreign Application Priority Data

Mar. 24, 2003   (SE) ..................................... 0300799

(51) Int. Cl.
H02K 1/00   (2006.01)
(52) U.S. Cl. ..................................... 310/216; 310/254
(58) Field of Classification Search ................ 310/216, 310/217, 218, 254
See application file for complete search history.

(56) References Cited

U.S. PATENT DOCUMENTS 4,392,073 A * 7/1983 Rosenberry, Jr. ............ 310/216
4,698,539 A * 10/1987 Workman .................... 310/216
6,472,792 B1 * 10/2002 Jack et al. ................... 310/254

FOREIGN PATENT DOCUMENTS

| EP | 0 795 881 | 9/1997 |
|----|-----------|--------|
| JP | 10-309049 | 11/1998 |
| JP | 2002-10537 | 1/2002 |

* cited by examiner

Primary Examiner—Darren Schuberg
Assistant Examiner—Nguyen Hanh
(74) Attorney, Agent, or Firm—Buchanan Ingersoll & Rooney PC

(57) ABSTRACT

A stator core for an electrical machine and a method for producing the same. Said stator core comprising a core back and a plurality of teeth arranged circumferentially at the core back and extending radially there from. The core back being made of at least one sheet of electrically insulated soft magnetic material arranged as a spiral. Said method comprising the acts of winding a sheet of electrically insulated soft magnetic material into a spiral in order to form a core back and attaching a plurality of teeth to the core back so that the teeth are circumferentially separated and extends radially from the core back.

22 Claims, 4 Drawing Sheets

SECTION A-A

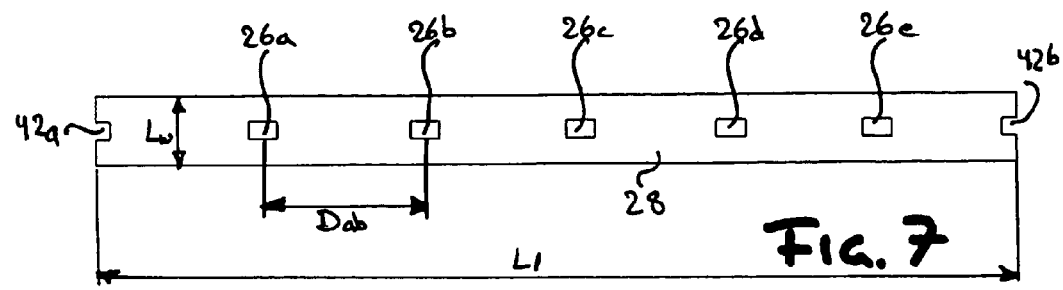
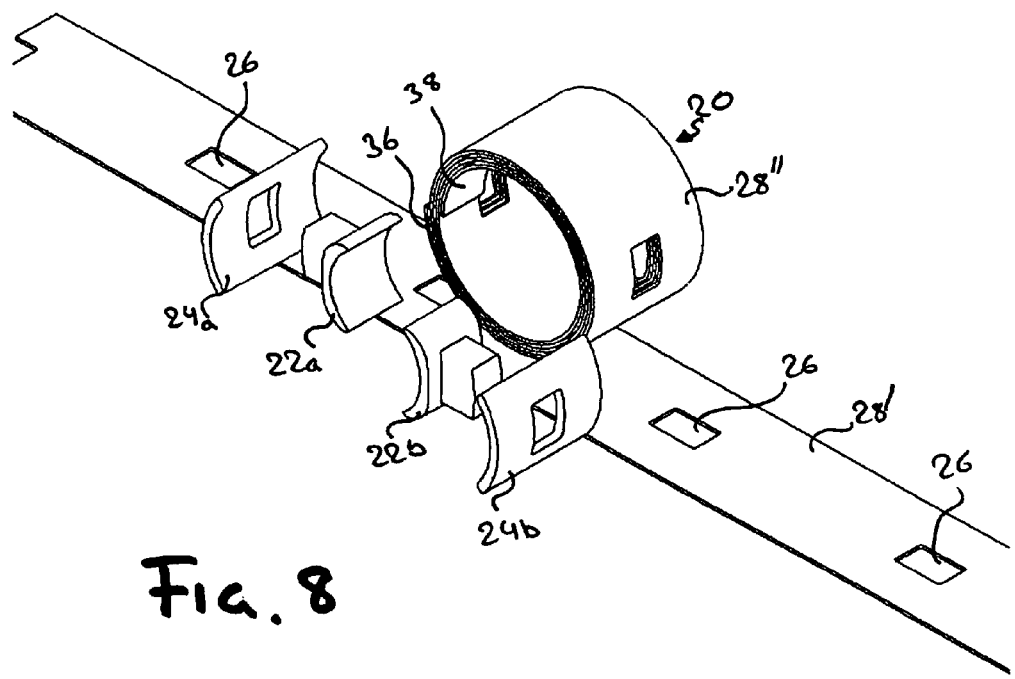

STATOR OF AN ELECTRICAL MACHINE

The benefit is claimed under 35 U.S.C. § 119(a)–(d) of Swedish Application No. 0300799-4 filed Mar. 24, 2003, and under 35 U.S.C. § 119(e) of U.S. Provisional Application No. 60/473,195 filed May 27, 2003.

TECHNICAL FIELD OF THE INVENTION

The present invention is generally related to electrical machines and in particular to a stator and the core back of a stator of an electrical machine.

BACKGROUND OF THE INVENTION

The stator of electrical machines generally comprises teeth and a core back. The function of the teeth is to lead magnetic flux induced in the teeth by a coil arranged round the teeth and, thus, the teeth increases the efficiency of the interaction between the stator and a rotor, in respect of a stator having no teeth. The core back is arranged to magnetically connect the teeth to each other in order to provide a flux feedback loop having low reluctance, i.e. it may be seen as closing the magnetic circuit generating flux for interaction with a rotor.

The stator cores of electrical machines has generally been made of solid soft magnetic material, e.g. iron. One problem with these types of stator cores is that eddy currents is induced in the stator core. To reduce this problem with eddy currents the stator cores of today is made of laminated sheets of electrically insulated soft magnetic material or of iron powder being electrically insulated.

SUMMARY OF THE INVENTION

It is an object of the present invention to provide an improved stator and especially an improved core back.

This object is accomplished by means of a stator core by means of a core back and by means of a method of producing a stator core. Preferred embodiments of the invention are disclosed in the dependent claims.

In particular a stator core for an electrical machine, according to a first aspect of the invention, comprises a core back, and a plurality of teeth arranged circumferentially at the core back and extending radially there from, wherein the core back is at least one sheet of electrically insulated soft magnetic material arranged as a spiral.

Additionally, a core back for an electrical machine, according to second aspect of the invention, is at least one sheet of electrically insulated soft magnetic material arranged as a spiral.

In the context of the present invention the word spiral is defined as a winding around a center gradually receding from or approaching it. Further, in the context of the present invention, a sheet of electrically insulated soft magnetic material means a sheet provided with electrical insulation on the surface in order to decrease the effects of eddy currents. Such sheets are well known by a person skilled in the art and are frequently used in electrical machines.

By designing the core back as at least one sheet of electrically insulated soft magnetic material arranged as a spiral may facilitate the manufacturing of stator cores. Such an arrangement may also lead to less material waste than in the production of stator cores of conventional design.

According to the second aspect, the core back may include openings arranged to receive teeth. The sheet may be elongated and said openings may be arranged not to cut the elongate edges of the sheet.

The following embodiments may refer to either the first or the second aspect.

Further, the core back may be annular.

According to one embodiment said sheet of electrically insulated soft magnetic material may be elongated and have a length, a width, and a thickness, and wherein the length of said sheet of electrically insulated soft magnetic material extends essentially circumferentially, the width of said soft magnetic material extends essentially axially, and the thickness of said soft magnetic material extends essentially radially.

According to another embodiment, said core back includes openings for receiving the teeth. This feature may make it easy to assemble the stator core. Additionally, the openings may support the teeth when mounted and, thus, resulting in a stable mounting of the teeth and a robust stator core. This may also result in a better flux path.

The sheet may be elongated and may include an opening at each end of said sheet. Thus, by arranging the opening of one end of the sheet at a tooth and the opening of the other end at the same tooth the area of electrically insulated soft magnetic material acting as a flux path at one side of a tooth may be essentially the same as the area at the other side.

The sheet may be fixed in the spiral shape by means of gluing, welding or soldering.

The sheet may include openings along a portion of its length. Thus, the openings may not have to extend all the way through the total thickness of the core back. This may facilitate the manufacturing of the core back.

The teeth may be fastened in the openings by means of force fitting, gluing, welding or soldering.

The sheet may be arranged to form essentially three turns.

Additionally, a method for producing a stator core for an electrical machine, according to third aspect of the invention, comprises the acts of:

winding a sheet of electrically insulated soft magnetic material into a spiral in order to form a core back, and attaching a plurality of teeth to the core back so that the teeth are circumferentially separated and extends radially from the core back.

The act of attaching a plurality of teeth to the core back may comprise arranging the teeth into openings in the core back.

The act of attaching the teeth to the core back may comprise force fitting, gluing, welding or soldering.

The method may comprise the act of fixing the sheet in the shape of said spiral by means of gluing, welding or soldering.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which:

FIG. 7 shows a schematic view of a sheet of electrically insulated soft magnetic material that may be used to make the core back of FIG. 4, FIG. 8 illustrates a method for producing the stator in FIG. 2.

DETAILED DESCRIPTION OF EMBODIMENTS

Figure 1:
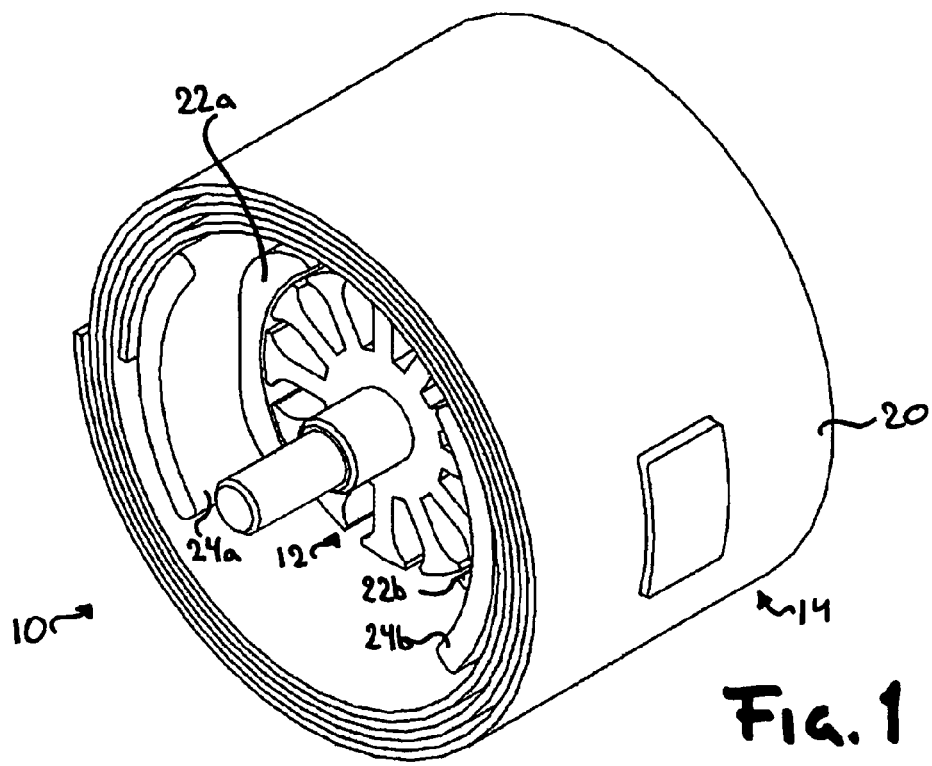
FIG. 1 shows a schematic perspective view of one embodiment of the stator when it is arranged together with a rotor to form a motor.

In FIG. 1 there is shown an electrical machine 10 comprising a rotor 12, a stator 14.

The rotor 12 may be a conventional rotor. Thus, the rotor may be a conventional permanent magnet rotor, a conventional synchronous rotor, a conventional asynchronous rotor, a conventional Switched Reluctance rotor (SR-rotor), etc., but may also be a rotor of a construction similar to the construction of stator 14 according to the invention. Note, that the windings of the rotor is not shown in FIG. 1.

Figure 2:
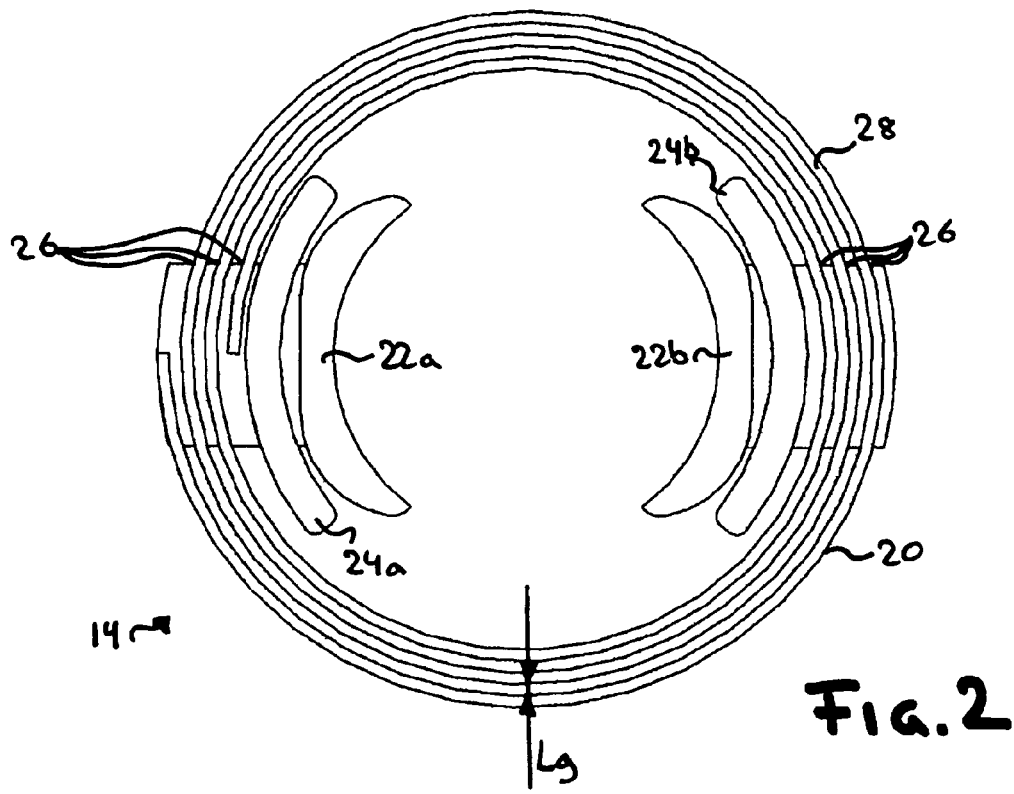
FIG. 2 shows a schematic front view of the stator of FIG. 1.
Figure 3:
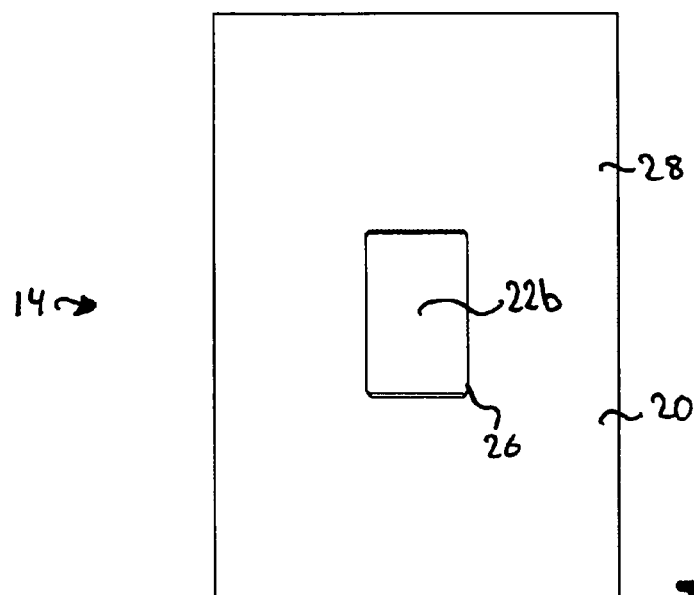
FIG. 3 shows a schematic side view of the stator of FIG. 1.
Figure 4:
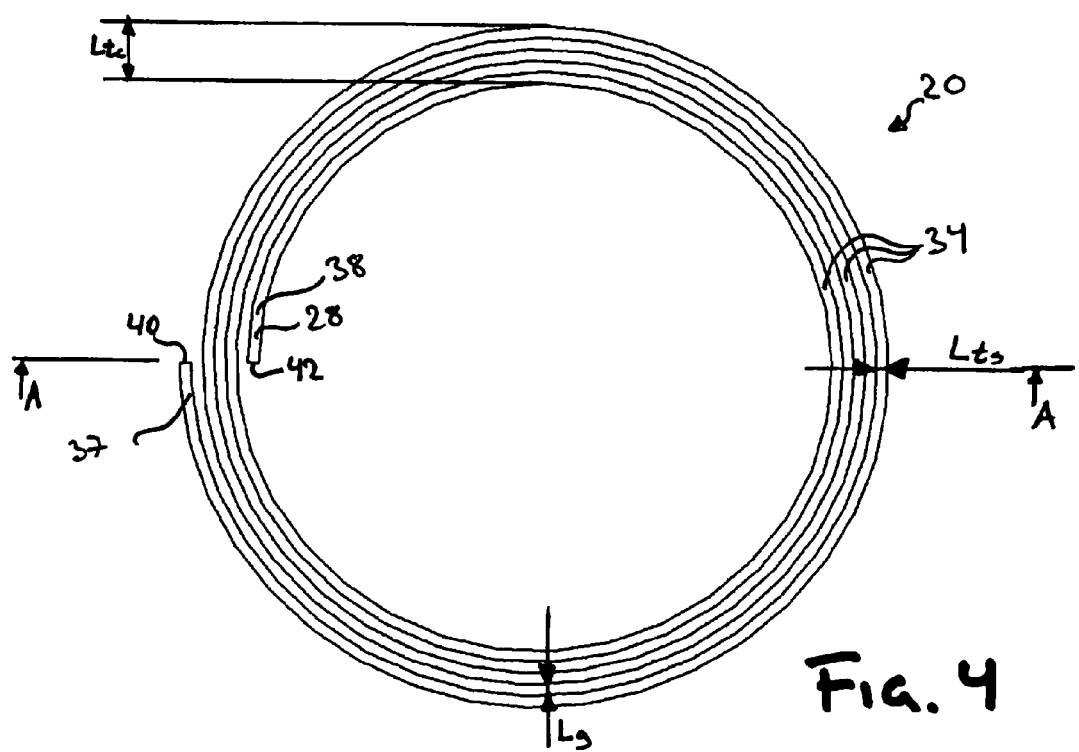
FIG. 4 shows a schematic front view of the core back of FIG. 1.
Figure 5:
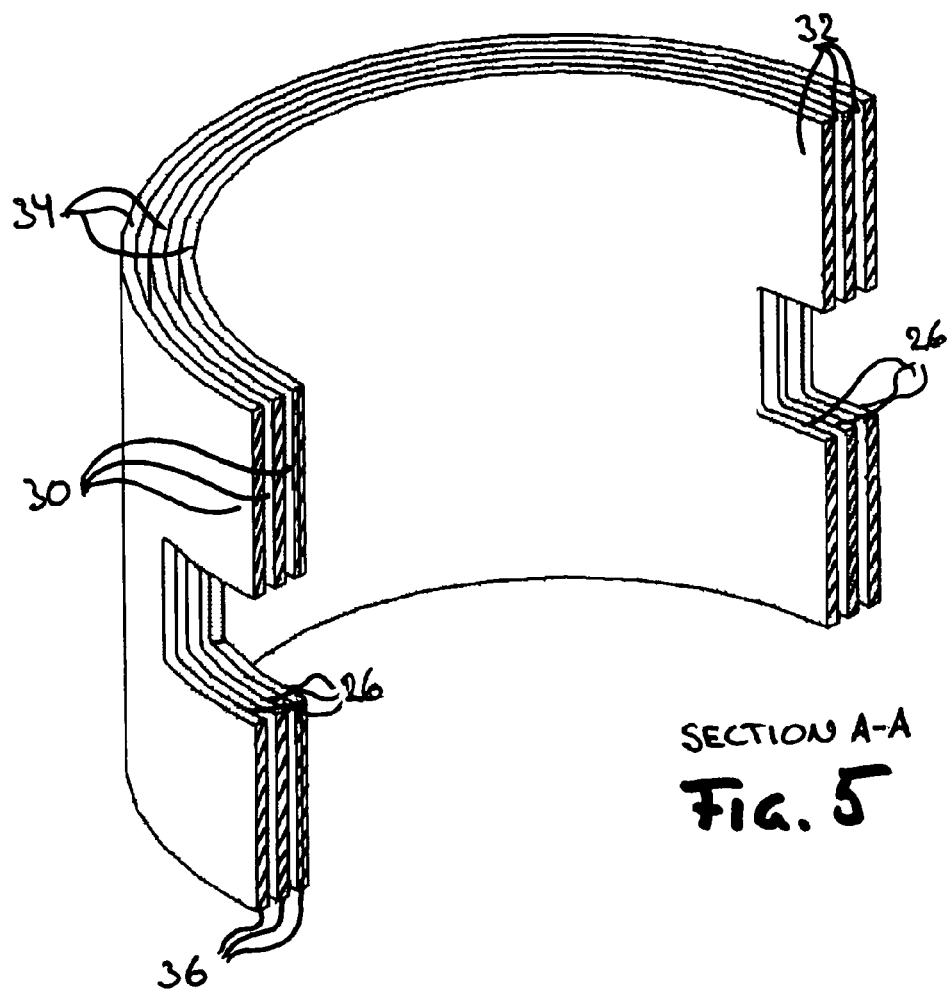
FIG. 5 shows a schematic perspective view of section A—A of the core back in FIG. 4.

In FIG. 1–3, one embodiment of the invention is shown schematically. The stator of this embodiment comprises a core back 20, two teeth 22a–b, and coils 24a–b.

The teeth 22a–b are separate components attached to the core back 20. In the present embodiment the teeth 22a–b are attached to the core back 20 by positioning the teeth 22a–b in openings 26 arranged in the core back 20. The teeth may then be force fit in the openings 26, glued, welded, or soldered to the core back.

The coils 24a–b may be a single winding, i.e. one wire wound into a coil and connected to an electrical supply unit, not shown, or a distributed winding, i.e. each stator coil includes wires that are connected to different outputs of the supply unit and may thereby carry electricity having differing electrical characteristics. A person skilled in the art of electrical motors know many different types of electrical supply units which may be utilized. The skilled person also knows how to connect a single winding or a distributed winding to such electrical supply units. Further, the coils may be pre-wound prior to being positioned around a tooth 22a or 22b, because the teeth 22a–b are separate components. Thus, the coils may also be bobbin wound.

The core back 20 of this embodiment is a single sheet 28 of electrically insulated soft magnetic material wound into a spiral. The surface of the sheet 28 of electrically insulated soft magnetic material is preferably covered with an insulating material in order to minimize the effect of magnetic flux inducing an electric current flowing from one layer of soft magnetic material to another, such electric currents are known as eddy currents. In the FIGS. 1,2,4 and 5 the sheet 28 of electrically insulated soft magnetic material formed to a spiral is schematically showed in order to facilitate the understanding of the forming of the core back 20. Therefore, the gap Lg between one turn and another of the sheet 28 is exaggerated. In an perfect, with respect to compactness, core back 20 the gap Lg does not exist and two adjacent turns are arranged in close contact with each other. However, in reality, there may be a small gap between adjacent turns.

Now referring to the FIGS. 4–7, according to the present embodiment the core back 20 is made of one single sheet 28 of electrically insulated soft magnetic material. The sheet 28 of electrically insulated soft magnetic material includes a first surface 30 and a second surface 32, which are arranged on opposite sides of said sheet of electrically insulated soft magnetic material. The area of each of the first and second surface being larger than the area of any one of two longitudinal edge surfaces 34, 36 of said sheet of electrically insulated soft magnetic material, also these two surfaces 34, 36 are arranged opposite to each other. Said sheet 28 of electrically insulated soft magnetic material further includes two end portions 37 and 38 each having an end surface 40 and 42, the area of each end surface being smaller than the area of any one of the first and second surface 30, 32.

In the present embodiment the sheet 28 of electrically insulated soft magnetic material is arranged to form a spiral by bending said sheet 28 so that the second surface 32 of said sheet is arranged facing the first surface 30 of the same sheet 28 of electrically insulated soft magnetic material for a number of turns. In the present embodiment the sheet is arranged to form three turns having increasing or decreasing radius, depending of whether the core back is studied from the outside in or from the inside out. However, the number of turns may be greater, in some cases even lesser. In the present embodiment the core back 20 has a thickness $L_{tc}$ in the radial direction corresponds to essentially the thickness of three sheets 28 of electrically insulated soft magnetic material, each sheet having a thickness of $L_{ts}$. However, the thickness $L_{tc}$ may be increased by including additional turns of the sheet 28 of electrically insulated soft magnetic material in the spiral and, thus, it may be decreased by including less turns. The scope of the invention is, however, not intended to be limited to a core back 20 having the thickness $L_{tc}$ which is given as an example above.

Figure 6:
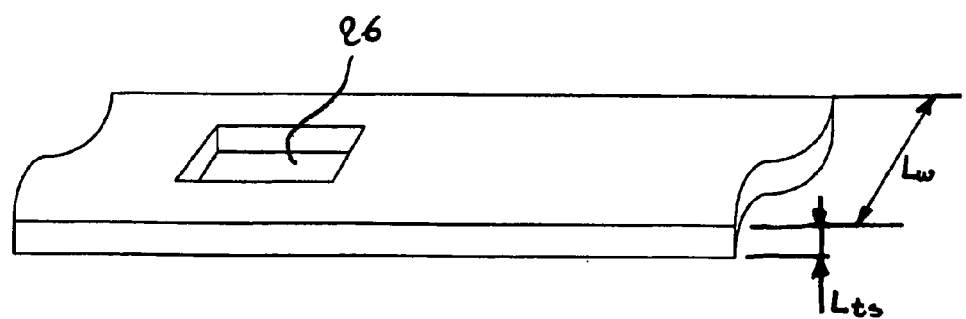
FIG. 6 shows a schematic view of a portion of a sheet of electrically insulated soft magnetic material according to an embodiment of the present invention.

In FIGS. 6–7, a sheet 28 of electrically insulated soft magnetic material, according to one embodiment, is shown before it is bent to form the spiral of the core back 20. This sheet 28 may also be called a blank. The sheet 28 of electrically insulated soft magnetic material according to this embodiment is an elongated sheet having a length $L_1$, a width $L_w$ and a thickness $L_{ts}$. Further, said sheet 28, according to the present embodiment, includes openings 26a–c. It is in these openings the teeth 22a–b are arranged when the sheet 28 is bent to form the spiral shape resulting in the core back 20. The distance, e.g. $D_{ab}$ in FIG. 7, between two adjacent openings 26a–c varies as a function of the number of teeth of the stator, the radius of the core back 20, the thickness of the sheet 28 of electrically insulated soft magnetic material, and/or the distance from one of the two ends of the sheet 28 of electrically insulated soft magnetic material. This distance $D_{ab}$ between two adjacent openings increases the further from a geometrical center of the core back the openings are supposed to be arranged when forming a spiral.

According to this embodiment the sheet 28 of electrically insulated soft magnetic material includes an opening 42a–b, which is not encircled by the sheet 28 of electrically insulated soft magnetic material, at each end of said sheet 28. These openings 42a–b are to be arranged at one of the teeth in order to make sure that the area of electrically insulated soft magnetic material acting as a flux path at one side of a tooth is essentially the same as the area at the other side, i.e. if there is arranged a number of x layers of said sheet 28 of electrically insulated soft magnetic material at one side of a tooth there should be a number of x layers arrange at the other side.

One method of producing a stator core according to the invention will now be explained with reference to FIG. 8. Openings 26 are made in an elongated sheet 28' of electrically insulated soft magnetic material. Then, this elongated sheet 28' is wound into a spiral shaped core back 20. During the wounding of the sheet a plurality of openings 26 are aligned in order to define an opening in which teeth 22a–b of the stator core may be arranged. In the FIG. 8 two openings are defined in the core back and, thus every second opening 26 in the sheet 28' of electrically insulated soft magnetic material are aligned with each other.

The teeth 22a–b of the stator core are provided with coils 24a–b and then attached to the core back 20. In this embodiment the teeth 22a–b are attached to the core back 20 by inserting them into respective opening in the core back 20. The teeth may be fastened in the opening by means of force fitting, gluing, welding, soldering, etc.

Force fitting may for instance be when the teeth is forced into openings that have a smaller circumference than the teeth. Another example of force fitting may be provided by winding the sheet into a spiral aligning the openings 26 in the sheet, which are of such dimension that they may easily receive a tooth. When the teeth are positioned in the openings in the core back, provided by means of the aligned openings, a force provided at the spiral in order to keep the openings in the sheet aligned is relaxed and due to a strive of the sheet to return to the plane shape, i.e. not the spiral shape, the teeth will be locked in position. If this force in the sheet is to small the spiral may instead be subjected to a external force creating the desired gripping force in the openings that locks the teeth in position. When the desired gripping force in the openings are achieved the spiral may be fixed.

If the core back does not comprise openings for the teeth to be fastened in, they may be fastened at the core back by soldering, welding, gluing, etc.

The sheet 28" may be fixed in the spiral shaped position by means of gluing, welding, soldering, etc., the end portions 36, 38 of said sheet 28" to the adjacent layer in the spiral.

According to another embodiment of the invention the stator may include more than two teeth. In such embodiments the number of openings and/or the number of layers of the spiral has to be altered.

According to yet another embodiment the core back may include more than one sheet of electrically insulated soft magnetic material.

The invention claimed is:

1. Stator core for an electrical machine, said stator core comprising:
   a core back, and
   a plurality of teeth arranged circumferentially at the core back and extending radially there from,
   wherein the core back is at least one sheet of electrically insulated soft magnetic material arranged as a spiral,
   wherein said core back includes openings each associated with a tooth, a portion of each tooth is inserted into an associated opening, and
   wherein each end of the sheet includes an opening which is not encircled by the sheet, said openings at each end of the sheet being arranged at a same tooth.

2. Stator core according to claim 1, wherein the core back is annular.

3. Stator core according to claim 1, wherein said sheet of electrically insulated soft magnetic material is elongated and has a length, a width, and a thickness, and
   wherein the length of said sheet of electrically insulated soft magnetic material extends essentially circumferentially, the width of said soft magnetic material extends essentially axially, and the thickness of said soft magnetic material extends essentially radially.

4. Stator core according to claim 1, wherein the sheet is elongated and includes an opening at each end of said sheet.

5. Stator core according to claim 1, wherein said sheet is fixed in the spiral shape by means of gluing, welding or soldering.

6. Stator core according to claim 1, wherein the teeth are arranged to be fastened in the openings by means of force fitting, gluing, welding or soldering.

7. Stator core according to claim 1, wherein the sheet is arranged to form three turns.

8. Core back for an electrical machine wherein the core back is at least one sheet of electrically insulated soft magnetic material arranged as a spiral, wherein said core back includes openings each associated with a tooth, a portion of each tooth is inserted into an associated opening, and wherein each end of the sheet includes an opening where is not encircled by the sheet, said openings at each end of the sheet being arranged at a same tooth.

9. Core back according to claim 8, wherein the core back is annular.

10. Core back according to claim 8, wherein said sheet of electrically insulated soft magnetic material is elongated and has a length, a width, and a thickness, and
    wherein the length of said sheet of electrically insulated soft magnetic material extends essentially circumferentially, the width of said soft magnetic material extends essentially axially, and the thickness of said soft magnetic material extends essentially radially.

11. Core back according to claim 8, wherein said sheet is elongated and said openings are arranged not to cut the elongate edges of said sheet.

12. Core back according to claim 11, wherein the sheet is elongated and includes an opening at each end of said sheet.

13. Core back according to claim 8, wherein said sheet is fixed in the spiral shape by means of gluing or welding or soldering.

14. Core back according to claim 8, wherein the sheet is arranged to form three turns.

15. Method for producing a stator core for an electrical machine, comprising the steps of:
    winding a sheet of electrically insulated soft magnetic material into a spiral in order to form a core back, each end of the sheet including an opening which is not encircled by the sheet, and
    attaching a plurality of teeth to the core back so that the teeth are circumferentially separated and extend radially from the core back, wherein the step of attaching a plurality of teeth to the core back comprises inserting a portion of each tooth into an associated opening in the core back and arranging said openings at each end of the sheet at a same tooth.

16. Method according to claim 15, wherein the step of attaching the teeth to the core back comprises force fitting, gluing, welding or soldering.

17. Method according to claim 15, further comprising the step of fixing the sheet in the shape of said spiral by means of gluing, welding or soldering.

18. Core back according to claim 9, wherein said core back includes openings arranged to receive teeth, wherein said sheet is elongated and said openings are arranged not to cut the elongate edges of said sheet.

19. Core back according to claim 10, wherein said core back includes openings arranged to receive teeth, wherein said sheet is elongated and said openings are arranged not to cut the elongate edges of said sheet.

20. Stator core according to claim 1, wherein each tooth is inserted into a respective opening.

21. Core back according to claim 8, wherein each tooth is inserted into a respective opening.

22. Method according to claim 15, wherein each tooth is inserted into a respective opening in the core back.

* * * * *